United States Patent [19]

Dobler

[11] 4,206,905
[45] Jun. 10, 1980

[54] GATE VALVE

[75] Inventor: Otto Dobler, Balsthal, Switzerland

[73] Assignee: Von Roll AG., Switzerland

[21] Appl. No.: 896,504

[22] Filed: Apr. 17, 1978

[30] Foreign Application Priority Data

Apr. 18, 1977 [CH] Switzerland ............... 4761/77

[51] Int. Cl.² ............................................. F16K 3/02
[52] U.S. Cl. .................................... 251/328; 251/329
[58] Field of Search .................... 251/326, 328, 329; 138/94.3

[56] References Cited

U.S. PATENT DOCUMENTS

| | | | |
|---|---|---|---|
| 2,873,085 | 2/1959 | Allen | 251/328 X |
| 2,934,313 | 4/1960 | Allen | 251/328 |
| 3,071,342 | 1/1963 | Allen | 251/328 X |
| 3,071,343 | 1/1963 | Milleville | 251/328 X |
| 4,026,517 | 5/1977 | Still | 251/328 X |

Primary Examiner—Arnold Rosenthal
Attorney, Agent, or Firm—Roylance, Abrams, Berdo & Farley

[57] ABSTRACT

The disclosed valve has a seating gasket with a cross-sectional profile which includes an anchoring portion disposed in the bottom of the gasket groove in the fluid passageway. A seating portion of the gasket extends up from the anchoring portion and is narrower than the anchoring portion, so that the anchoring portion is exposed in the groove on both sides of the seating portion. A pair of fillets are held in the groove on both sides of the seating portion of the gasket and adjacent the anchoring portion to fix the gasket in the groove and to guide the valve disc between them. The gasket has longitudinal ribs to improve sealing and may be integral with an elongate toroid gasket for sealing against the valve disc in the neck of the valve.

9 Claims, 5 Drawing Figures

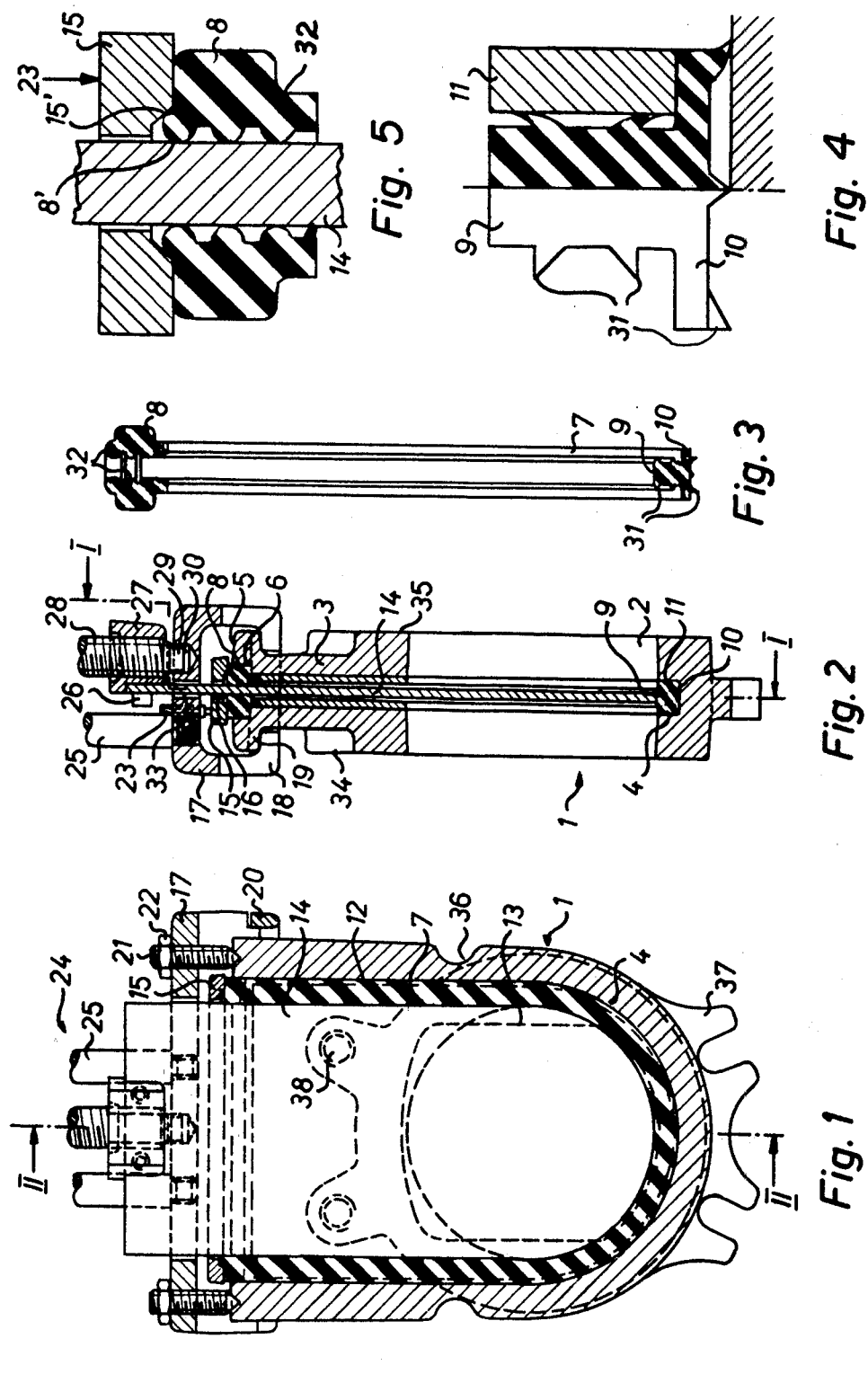

ized slot for receiving the soft packing, to use additional retaining means in order to hold the packing in form-locked manner in the slot. For this purpose the soft packing on one side of the relatively large slot is engaged on a contact surface arranged at right angles and somewhat inclined relative to the flow channel axis. On the opposite side of the soft packing there is provided a U-shaped fillet and the packing is pressed onto the contact surface by screws. To ensure that the soft packing cannot be displaced outwards, it is also at least partly secured by a web on its outer periphery, whereby the flange is pressed by screws against the packing. This admittedly provides a reliable soft packing, but such a structure is relatively expensive.

GATE VALVE

BACKGROUND OF THE INVENTION

Compared with other types of valves, wafer gate valves have advantages due to their very small overall length and their reliability in use with various flow media, especially thick substances, which ensure that they are used in certain applications, particularly in industrial processing. The seal between the valve casing and the valve disc is made by means of a soft packing gasket. In the known constructional valve forms, this packing gasket is placed between the two halves of a split valve casing. However, it is then necessary to also seal the joint between both casing halves which, due to the large sealing surface, limits the use of such valves to small pressures. In addition, long machining times are required. These disadvantages are not present for a valve with a one-part valve casing. However, for such valves the soft packing gasket must be arranged in the valve casing in such a way that on the one hand it is reliably secured therein, so that it is not torn out by the flow forces occurring in the valve channel, particularly on partially opening the valve, and on the other it also provides a completely satisfactory seal with the valve casing.

In a known gate valve (French Pat. No. 1,467,759), a slot provided with an O-ring seal is located in a one-part valve casing. However, the O-ring is not secured in a reliable manner, so that it can be torn out under certain valve operating conditions.

In order to obviate this disadvantage, it is known (German Pat. No. 1,750,594), while utilizing the advantage of a one-part valve casing with an unmachined slot for receiving the soft packing, to use additional retaining means in order to hold the packing in form-locked manner in the slot. For this purpose the soft packing on one side of the relatively large slot is engaged on a contact surface arranged at right angles and somewhat inclined relative to the flow channel axis. On the opposite side of the soft packing there is provided a U-shaped fillet and the packing is pressed onto the contact surface by screws. To ensure that the soft packing cannot be displaced outwards, it is also at least partly secured by a web on its outer periphery, whereby the flange is pressed by screws against the packing. This admittedly provides a reliable soft packing, but such a structure is relatively expensive.

It would be desirable to improve a gate valve of the type described above, so that the soft packing is held in a simple, reliable and form-locked manner and preferably in an unmachined slot and for a casing of either one or two parts.

SUMMARY OF THE INVENTION

In a novel gate valve in accordance with the present invention, the gasket is wider than the thickness of the valve and is held in position in a groove by fillets.

BRIEF DESCRIPTION OF THE DRAWINGS

The invention is described in greater detail hereinafter relative to specific embodiments and with reference to the attached drawings, which show:

FIG. 1 a front-sectional view of a wafer gate valve in accordance with a preferred embodiment of the present invention in a section along the line I—I of FIG. 2;

FIG. 2 a section through the gate valve of FIG. 1 along the line II—II of FIG. 1;

FIG. 3 a side section profile of the soft packing gasket of the gate valve of FIGS. 1 and 2 in the unfitted state;

FIG. 4 a side section through an enlarged portion of the soft packing profile of FIG. 3;

FIG. 5 a section through an enlarged fragment of an O-ring toroid portion of the soft packing of FIG. 3 arranged on the edge of the casing on the spindle side.

DETAILED DESCRIPTION OF THE PREFERRED EMBODIMENTS

The gate valve shown in FIGS. 1 and 2 has a valve casing 1 with a flow channel passageway 2 and a casing neck 3. In the valve casing 1 there is provided an annular seating groove or slot 4, which extends around the passageway 2 and up to the free edge 5 of casing neck 3 and at this point passes into a widened recess or trough 6. In slot 4 and trough 6 there is placed a soft packing gasket, which, according to FIG. 3, is a single part made up integrally of a U-shaped section 7 and an elongate toroid or O-ring 8. The soft packing 7, 8 may also comprise separate parts 7 and 8 (FIG. 2).

As is shown in FIGS. 2 and 3, section 7 has a T-shaped cross-sectional profile which includes a seating portion or web 9 and an anchoring portion integral therewith. The web 9 is directed towards flow channel passageway 2 and has arm portions 10 which are secured in form-locked manner in the seating slot 4 by the peripheries of fillets which are part of two guide plates which have apertures of equal size as the passageway 2 and in registry with it.

The guide plates 11 are constructed as plates with an outer contour corresponding to the dotted line 12 of FIG. 1 and an inner contour corresponding to dotted line 13 in FIG. 1. They guide the gate disc and also act as strippers for removing adhering material from the gate disc.

The two guide plates 11 and web 9 of section 7 define a narrow space within in which is movable a valve disc 14. In the closed position shown in FIGS. 1 and 2, the peripheral portion of the valve disc 14 engages on the free edge of packing section 7 and therefore forms a leak-proof seal. Since with both a manual or powered drive the valve disc 14 extends over the free edge 5 of the valve casing 1, it is necessary to seal the casing neck 3. This is effected by the elongated toroid O-ring 8 arranged in trough 6 and completely surrounding the disc 14.

To ensure that a particular sealing pressure is exerted on valve disc 14, a pressure plate 15 is arranged above the O-ring 8 and is provided with an opening slot 16 for the passage of disc 14.

In order that soft packing 7, 8 can exert sufficient pressure on the valve disc 14 to form a leak-proof seal, a bearing support 17 is arranged at the free end 5 of valve casing 1 to engage with claws 18 below a shoulder or flange 19 located at free end 5. The claws 18 are joined together on only one side to a web 20, so that the bearing support can be moved over the free edge 5 from the other side.

As shown in FIG. 1, locking screws 21 with lock nuts 22 are screwed into bearing support 17. Their tips press onto the free end 5 of valve casing 1 and the claws 18 on the underside of flange 19, so that bearing support 17 forms a platform rigidly fixed to valve casing 1. Into the bearing support 17 are screwed grub screws, not shown, whose ends can exert a pressure on pressure plate 15, so that a given sealing force is imparted to the soft packing 7, 8.

The bearing support 17 also serves as a support for a bearing frame 24 for the mounting of a manual or power drive for actuating the valve disc 14. The bearing frame 24 is not shown in detail, but only partly indicated in FIGS. 1 and 2 by posts 25.

A spindle nut 27 is secured by means of screws 26 to the upper end of valve disc 14 and is moved by a spindle 28 whose lower end 29 is mounted in a bore 30 of bearing support 17. The other end spindle 28, not shown, can be guided in a bearing plate which is carried by the posts 25. The spindle 28 can be driven manually or by a motor, as desired.

Packing section 7 has small longitudinal ribs 31 which extend over its entire length, as shown in FIGS. 3 and 4. The ribs are arranged both on the sidewalls of web 9 and on the outside of arms 10. Corresponding to their lip configuration, the ribs 31 have a small deformation resistance, so that the relatively large manufacturing tolerances for the slot can be bridged to give a completely satisfactory sealing action. As a result, slot 4 need not be machined to avoid sealing problems. As can be seen on the right-hand side of FIG. 4, ribs 31 are deformed in a sealing lip-like manner in the fitted state and therefore exert an increased sealing action with increasing internal pressure. O-ring 8 has beads 32 on the sealing side for valve disc 14 which ensure a substantially complete sealing of disc 14 towards the outside, as shown in FIG. 5. To prevent any outward displacement of O-ring 8, the pressure plate 15 has on its underside an inclined surface 15' on which the outer bead 8' bears. This increases its sealing action on valve disc 14 for increasing pressure within the valve. By means of the grub screw force, indicated diagrammatically by an arrow 23 in FIG. 5, the pressure exerted on O-ring 8 can be deflected in the direction of the pressure plate 15.

The assembly of the gate valve is simple. From the free edge 5, soft packing 7, 8, together with the guide plates 11 are inserted in slot 4. Bearing support 17 is moved onto the free edge 5, and simultaneously the pressure plate 15 is placed on O-ring 8. Valve disc 14 is now introduced through a slot 33 arranged in bearing support 17 and a slot 16 in pressure plate 15 into the space formed by the soft packing 7, 8 and the guide plates 11. Bearing support 17 is screwed down by means of locking screws 21 and is secured by lock nuts 22, after which the grub screws 23 are fitted and the bearing frame 24 is provided with a hand or power drive. For fitting and removing the soft packing 7, 8 and guide plates 11, which can form an integral assembly, there is no need to split the valve casing 1.

Flow channel 2 in valve casing 1 has at the lateral surfaces 34, 35 a circular configuration and in the area of valve disc 14 a shape corresponding to the inner contour 13 of the guide plates 11. Therefore, in the case of partial opening, the valve disc 14 can bear on valve casing 1 on either side of the flow channel via the guide plates 11.

The guide plates 11 can be made from various materials, e.g. metal, plastics or plastics-coated material. As they serve not only for the form-locked mounting of the soft packing 7, 8, but also for guiding the valve disc 14, their surface can be provided with a friction-reducing covering.

As can be gathered from FIG. 2, the spindle 28 is displaced relative to the plane of the valve disc 14, so that it is possible to use a spindle drive with a non-rising spindle.

What is claimed is:

1. A gate valve comprising
    a unitary casing with upper and lower edges, with a fluid passageway extending therethrough along a flow axis and with an interior chamber opening on said upper edge, said chamber being in the form of a narrow slot having two parallel side walls oriented perpendicular to said flow axis and having a groove between said side walls which encircles said passageway;
    a frame coupled to said casing upper edge;
    a gate mounted in said chamber by adjusting means coupled to said frame for moving said gate within said chamber and relative to said casing;
    a soft, unitary gasket mounted in said groove having a U-shaped section extending from said lower edge to said upper edge of said casing and having an upper sealing portion generally in the form of an elongated toroid;
    a recess extending on each side of said gate defined by said U-shaped section and said upper sealing portion of said gasket; and
    a guiding plate mounted in each of said recesses having an upper edge contacting said upper sealing portion.

2. A gate valve according to claim 1, wherein said U-shaped section of said gasket has an anchoring portion disposed in the bottom of said groove and a seating portion extending inwardly from said anchoring portion, said seating portion being narrower than said anchoring portion in a direction parallel to said flow axis to expose said anchoring portion in said groove on both sides of said seating portion.

3. A gate valve according to claim 1, wherein a recess is provided in said casing upper edge, said upper sealing portion is mounted in said recess and surrounds and presses against opposite sides and edges of said gate, and pressure means having a clearance slot through which said gate passes is provided for pressing against said upper sealing portion to press it firmly against said gate plate.

4. A gate valve according to claim 1, wherein said gasket and said guiding plates are coupled to enable said gasket and said guiding plates to be removed as an assembly from said casing through said upper edge.

5. A gate valve according to claim 1, wherein said gasket has longitudinal ribs on surfaces thereof which form a seal with said casing.

6. A gate valve according to claim 1, wherein the entire periphery of each of said guiding plates is in sealing engagement with said gasket to anchor said gasket in said groove; and each of said guiding plates has an aperture in alignment with said fluid passageway.

7. A gate valve according to claim 1, wherein said guide plates and said U-shaped section of said gasket overlap adjacent said fluid passageway.

8. A gate valve according to claim 1, wherein said toroid of said gasket is defined by an axis which is perpendicular to said flow axis.

9. A gate valve comprising
    a casing with a fluid passageway therethrough and with an annular seating groove about an interior wall of said casing;
    a gasket disposed at least partially in said seating groove;

valve disc means including a valve disc member which enters said passageway and presses at its periphery against said gasket to form a seal for closing the valve;

a neck formed on one side of said casing having a slot therethrough which said valve disc member can be drawn from said passageway to open the valve and having a shoulder about its outer perimeter remote from said passageway and substantially in a plane perpendicular to said valve disc member;

valve disc sealing means in said neck for forming a seal between said slot and said valve disc member;

guide means disposed adjacent both sides of said gasket for guiding said valve disc member to align it with said gasket and for preventing displacement of said gasket from said groove by fluid flow in said passageway;

a bearing support member fitted over an end of said neck and engaging an inner side of said shoulder, said bearing support having a slot through which said valve disc member extends;

locking screws which press said bearing support away from said neck to fix rigidly said bearing support against said shoulder; and valve disc member driving means fixed to said bearing support for moving said valve disc member.

* * * * *